US005303370A

United States Patent [19]

Brosh et al.

[11] Patent Number: 5,303,370

[45] Date of Patent: Apr. 12, 1994

[54] ANTI-COUNTERFEITING PROCESS USING LENTICULAR OPTICS AND COLOR MASKING

[75] Inventors: Scott Brosh, Arlington; Timothy Wright, Lake Dallas, both of Tex.

[73] Assignee: Score Group, Inc., Grand Prairie, Tex.

[21] Appl. No.: 976,196

[22] Filed: Nov. 13, 1992

[51] Int. Cl.[5] .......... H04L 9/00

[52] U.S. Cl. .......... 380/51; 380/23

[58] Field of Search .......... 380/23, 51

[56] References Cited

U.S. PATENT DOCUMENTS

| | | |
|---|---|---|
| 3,166,625 | 1/1965 | Brumley . |
| 3,178,993 | 4/1965 | Ferris et al. . |
| 3,199,429 | 8/1965 | Rice . |
| 3,232,202 | 2/1966 | Rice . |
| 3,241,429 | 3/1966 | Rice et al. . |
| 3,301,154 | 1/1967 | Stewart et al. . |
| 3,348,264 | 10/1967 | Rice et al. . |
| 3,524,395 | 8/1970 | Alasia . |
| 3,560,296 | 2/1971 | Anderson . |
| 3,676,000 | 7/1972 | Mayer, Jr. et al. . |
| 3,781,109 | 12/1973 | Mayer, Jr. et al. . |
| 3,807,852 | 4/1974 | Hoydic . |
| 3,852,080 | 12/1974 | Godlewski et al. . |
| 3,937,565 | 2/1976 | Alasia . |
| 4,023,902 | 5/1977 | Ungerman . |
| 4,092,654 | 5/1978 | Alasia . |
| 4,202,626 | 5/1980 | Mayer, Jr. et al. . |
| 4,835,713 | 5/1989 | Pastor .......... 380/51 |
| 4,891,666 | 1/1990 | Gordon . |
| 4,989,244 | 1/1991 | Naruse et al. .......... 380/23 |

*Primary Examiner*—David C. Cain

*Attorney, Agent, or Firm*—Lawrence A. Hoffman

[57] ABSTRACT

An image of a symbol or other indicium of origin or authenticity is encrypted, and printed on the item or a label in superposition with a color mask. In a preferred embodiment, an intermediate parallax record is formed of a series of images of a symbol or other indicium, each differing from the preceding one by a predetermined amount of parallax (i.e. change of viewing angle.) A multiple exposure of the series of intermediate parallax record images is made through a lenticular screen to create the encrypted image of the indicium. The lenticular screen and the medium on which the multiple exposure is made are moved relative to each other between exposures. The encrypted image and the superimposed color mask are then printed as a composite image to produce an unintelligible criss-cross of colored lines. When viewed through a lenticular screen which matches that used to create the encrypted image, the original indicium is revealed in clear form.

65 Claims, 5 Drawing Sheets

ANTI-COUNTERFEITING PROCESS USING LENTICULAR OPTICS AND COLOR MASKING

BACKGROUND OF THE INVENTION

1. Field of the Invention

This invention relates to anti-counterfeiting, and more particularly to the use of lenticular optics and color masking to create tamper-evident indicia of origin on a document or other object. The invention is useful in a wide variety of applications including authenticating the origin of branded merchandise or identification cards such as driver's licenses or security passes, and preventing forgery of signatures on checks or credit cards by verification of the signature.

2. The Prior Art

In the field of optics, a lenticular array is an arrangement of closely spaced lens elements (or lenticules) capable of creating composite images. Such arrays, consisting of semi-spherical or semi-cylindrical lens elements, have been known and used for many years.

For example, screens formed of semi-cylindrical lenticules are used to produce animated and three dimensional displays. Examples of such applications may be found in Rice U.S. Pat. No. 3,199,429; Stewart, et al. U.S. Pat. No. 3,301,154; Anderson U.S. Pat. No. 3,560,296; and others.

It is also known that by photographing an object through a lenticular array, an image can be produced in which the original subject is incomprehensible to the unaided eye. However, if the resulting photograph is viewed through another lenticular array like that used to create the photograph, the original appearance of the object can be revealed. This has led to development of signature verification systems for bank checks, credit cards and the like. In such systems, a specimen of a signature is encrypted and printed on a document, and the encrypted signature is later decrypted and compared visually with the purported signature of the bearer to verify that the two match.

There are numerous patents directed to this application of lenticular optics. A representative, but by no means exhaustive sampling of these patents include Brumley, U.S. Pat. No. 3,166,625; Alasia, U.S. Pat. No. 3,937,565; Ungerman, U.S. Pat. No. 4,023,902; Alasia, U.S. Pat. No. 4,092,654 and Mayer, Jr., et al., U.S. Pat. No. 4,202,626.

Such prior art systems all suffer, to one degree or another, from several disadvantages. For example, use of some of these is limited by the fact that a counterfeiter may be able to produce an encrypted image of a bogus signature which is indistinguishable from the encrypted image of a valid signature.

Also, none of these systems can be used for authentication of the origin of an item since a skilled operator using a high quality graphic arts camera may be able to create indistinguishable duplicates of the encrypted image which may be applied to counterfeit articles.

Further, the prior art systems tend to limit the degree of reduction or enlargement between the original and encrypted images. This precludes use of some systems for signature verification as it may not be possible for the specimen signature to be written in a sufficiently small size for reproduction.

Obviously, there are other prior art anti-counterfeiting techniques which do not employ lenticular technology. Among these are computer aided design systems which seek to duplicate the classical skills of the engraver. These are used for the production of currency, financial instruments, and the like. Typical of these are the Aesthedes TM series of design workstations produced by BARCO Graphics of Gent, Belgium. Such systems can be used to produce complex designs which are hard, but not always impossible to duplicate or copy electrooptically using ultra high resolution scanners and precision film recorders. Moreover, such equipment is very expensive and complex, and can not be used in check verification systems.

SUMMARY OF THE INVENTION

In accordance with the invention, an image of a symbol or other indicium of origin or authenticity of the item in question is encrypted, and printed on the item or a label in superposition with a color mask. In a preferred embodiment, an intermediate parallax record is formed of a series of images of a symbol or other indicium, each differing from the preceding one by a predetermined amount of parallax (i.e. change of viewing angle.) The intermediate parallax record is then processed by an optical system including a lenticular screen to create an interlace-encrypted image of the indicium. The encrypted image and the superimposed color mask are then printed as a composite image (which will be referred to for convenience below as an "identifier".) The result is an unintelligible criss-cross of colored lines When the identifier is viewed through a lenticular screen which matches that used to create the encrypted image, the original indicium is revealed in clear form.

The indicium may be a logo or other trademark and the authenticator may be a small plastic card with the required lenticular array molded into it. In one application, where it is desired to protect the origin of collector cards bearing photographs of sports personalities or the like, the encrypted image and the superimposed color mask are printed unobtrusively on the card, and the authenticator is given to collectors or sold at a nominal price.

To verify that the card is genuine, the user views the encrypted image through the authenticator. If the encrypted image has been counterfeited or tampered with, it will be immediately evident, as the image will not be decoded or will appear with superimposed black lines. As a further check on the authenticity of the encrypted image, the color mask may be so arranged that when the authenticator is rotated 90 degrees, the user observes a rainbow pattern, and the image of the indicium returns to its encrypted form.

In another application, the encrypted image and the superimposed color mask are printed on a hang tag or other label which is applied to a branded item. The use of the encrypted identifier is appropriately promoted, and a suitable authenticator is made available for prospective customers who wish to verify that the item they are about to purchase is genuine.

In yet a further application, the principles of the invention are applied to signature verification. For this, the indicium may be a specimen signature of the holder of a checking account or a credit card. The authenticator may be an optical device including a lenticular screen to decode the encrypted image with additional means for side-by-side comparison between the decrypted image and the actual signature on the check or credit transaction record.

The use of the intermediate parallax record allows considerable flexibility in selection of the ultimate size of and the amount of information contained in the encrypted image. Also, in certain circumstances, it allows greater sharpness in the encrypted image, which in turn makes the identifier more difficult to counterfeit. The combination of the encrypted image and the superimposed color mask makes it impossible for the encrypted image to be copied by known graphic arts or electrooptical techniques. This precludes creation of an identifier derived from a counterfeit indicium which cannot be distinguished from a genuine one.

BRIEF DESCRIPTION OF THE DRAWING

The file contains at least one drawing executed in color. Copies of this patent with color drawing(s) will be provided by the Patent and Trademark Office upon request and payment of the necessary fee.

DETAILED DESCRIPTION OF THE PREFERRED EMBODIMENTS

Figure 1:
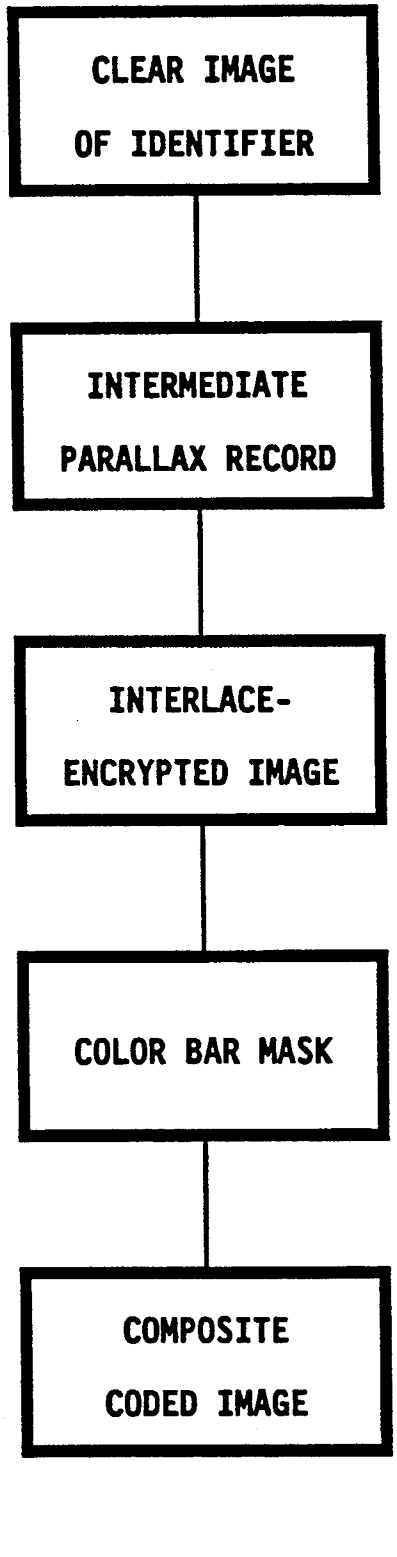
FIG. 1 is a flow chart showing the steps involved in practicing the present invention.

FIG. 1 shows in flow chart form, the sequence of steps involved in producing the coded image of an identifying indicium in accordance with this invention. The first step is to produce a clear image of the logo, printed word, specimen signature or other indicium selected to serve as the identifier. This may be an artist's rendering, printed text, an account signature card, etc. in color or black and white.

In the second step, the indicium is used to produce an intermediate parallax record. This may be done by photographing the indicium as it is moved through a succession of equal displacements across the field view of a first camera, or in other ways as described below.

This first camera may be of any type which will allow precise frame-to-frame registration of the unexposed film for the succession of images. Advantageously, the intermediate parallax record is produced on a single continuous film strip, but might alternatively be produced on a series of cut film sheets. The intermediate parallax record may be in black and white or color. Preferably, for convenience and to assure high resolution, it is made on 35 mm graphic arts film. Use of this concept in the context of a lenticular optical system for creating three-dimensional pictures is disclosed, for example in the above-mentioned Anderson U.S. Pat. No. 3,560,296.

Still referring to FIG. 1, the next step is to convert the intermediate parallax record into an interlace-encrypted image. In the preferred embodiment, this is done by projecting each frame of the intermediate parallax record onto a photosensitive medium in a second camera. The optical system for the second camera includes a lenticular screen and a carrier for the photosensitive medium which is movable relative to the lenticular screen and transversely to the camera field of view.

To produce the encrypted image, the first frame of the intermediate parallax record is exposed onto the photosensitive medium. Then, the intermediate parallax record is advanced to the next frame, and the photographic medium is moved by a precise incremental distance relative to the lenticular screen. The next exposure is made, and the process is repeated until an image is made on the photographic medium of the desired number of frames of the intermediate parallax record.

The resulting interlaced image is incomprehensible to the unaided eye but can be recreated in comprehensible form when viewed through a lenticular screen of the same spatial frequency as that used to create the interlaced image.

Although the interlace-encrypted image can not easily be duplicated, it can be done under certain circumstances with a good graphic arts camera system by an experienced camera operator. To avoid this, in accordance with the present invention, a color mask is provided consisting of two or three intersecting color elements, properly dimensioned, spaced and oriented in relation to the interlaced image as explained in more detail below.

In the final step, the interlace-encrypted image and the color mask are printed one on top of the other on the document to be protected. Any suitable printing process may be used for this step.

The resulting interlace-encrypted, color masked composite image which forms the identifier is extremely resistant to tampering. We have been unable to discover any electrooptical or graphic arts technique which can be used to dissect or reproduce the identifier that is not immediately evident when the invalid image is viewed through a lenticular screen matching that used to create a genuine interlace-encrypted image.

Figure 2:
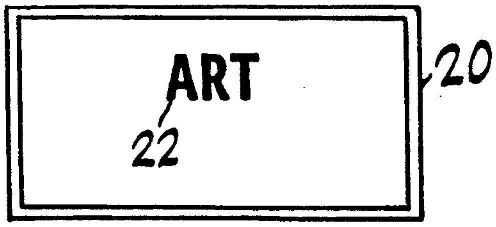
FIG. 2 is a representation of an indicium suitable for use in accordance with the present invention.
Figure 3:
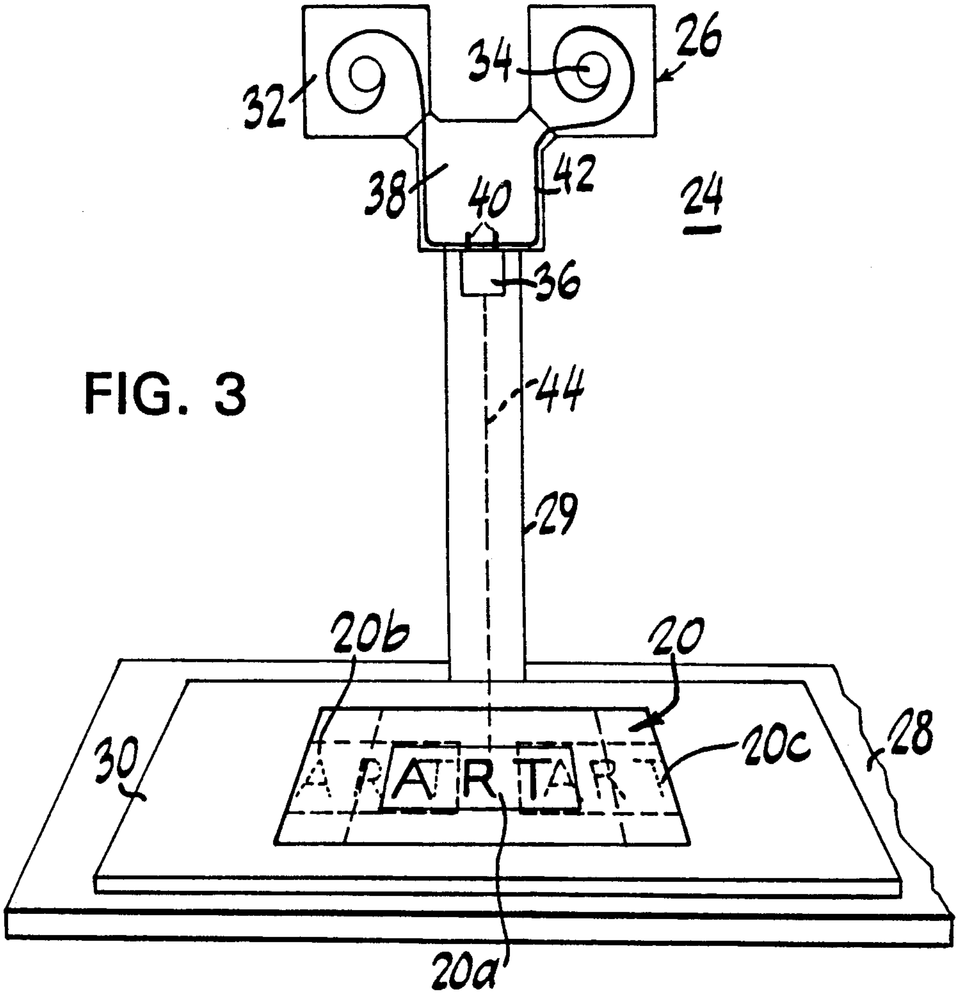
FIG. 3 is a schematic diagram of an apparatus suitable for use according to the present invention to create the intermediate parallax record of the indicium.
Figure 4:
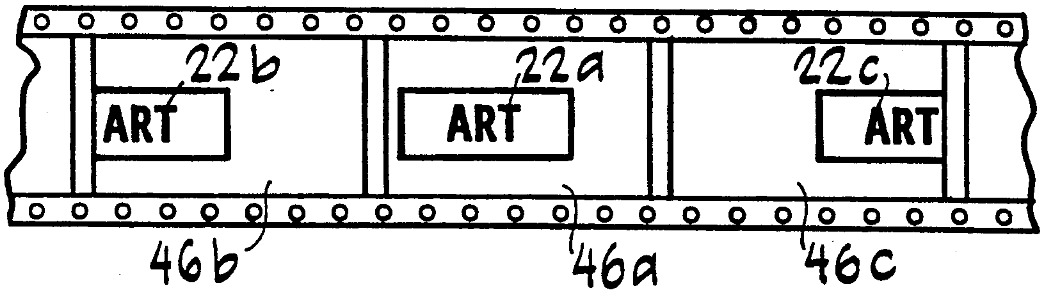
FIG. 4 is an enlarged representation of an intermediate parallax record of the indicium illustrated in FIG. 2.

Referring now to FIGS. 2 through 4, realization of the process depicted in FIG. 1 begins with the creation of an original image of the indicium selected as the identifier. As shown in FIG. 2, for purposes of this description, this will be assumed to consist of a rectangular sheet of artwork 20 containing a representative indicium 22 in the form of the word "ART".

FIG. 3 shows schematically, a suitable camera system, generally denoted 24, which may be used to produce the intermediate parallax record. This is essentially a standard animation camera system, and the details of its construction are not part of this invention.

Broadly, however, camera system 24 consists of a camera head 26, a fixed table 28, and a suitable mounting post or rail 29 by which the camera head 26 may be adjustably positioned relative to the table. A movable compound 30 is positioned on table 28. Indicia 20 is placed on compound 30.

Camera head 26 includes a film magazine 32, a take-up reel and winder mechanism 34, suitable optics 36, and an exposure chamber 38. The camera also includes a film transport mechanism having registration pins generally denoted 40 to assure precise frame-to-frame registration of a film strip 42 as it moves through the camera.

The details of the construction of movable compound 30 also do not form a part of this invention. It is only required that the compound 30 be constructed in such a fashion as to permit precise incremental advancement of indicium 20 across the optical axis 44 of the camera system.

The intermediate parallax record consists of a series of exposures in separate frames of indicia 20 as it is moved incrementally in front of the camera. Each image differs from the preceding one by the introduction of a predetermined amount of parallax. In FIG. 3, the image is shown at position 20*a* corresponding to given point in the process. Also shown in outline at 20*b* is the immediately preceding position of the image. Similarly, at 20*c* there is shown in outline, the location of image 20 after it is advanced incrementally for the next exposure. It is to be understood that the distances represented in FIG. 3 are greatly exaggerated; in fact an important feature of this invention is the employment of a large number of small incremental steps, and therefore a large number of frames in the intermediate parallax record, as explained more fully below.

FIG. 4 shows the resulting succession of the images constituting the intermediate parallax record. As may be seen, frame 46*b*, corresponding to position 20*b* in FIG. 3 shows the image of indicium 20 at the left end of the frame. Similarly, frame 46*a*, corresponding to position 20*a* in FIG. 3, shows indicium 20 at the center of the frame while frame 46*c*, corresponding to position 20*c* in FIG. 3 shows indicium 20 at the far right end of the frame. Again, it is to be understood that the distances shown in FIG. 4 are greatly exaggerated, and the advancement of indicium 20 across the succession of images will be in very small increments.

As will be appreciated by one skilled in the art, the intermediate parallax record may be produced in several ways other than that shown in FIG. 3. For example, indicium 20 may remain fixed on table 28, and camera 26 may be scanned to produce the series of images. Alternatively, camera 26 may be a motion picture camera. In that case, the indicium 20 is arranged to pass smoothly across the field of view of the camera, and the camera is operated to produce a succession of images. Yet another possibility is to scan the indicium with a video camera and to convert the electronic image to 35 mm format using a precision film recorder.

It is also within the scope of this invention to computer-generate the indicium and a series of incremental image displacements representing perspective changes. The resulting digital images which contain the required parallax information may then be recorded on 35 mm film, again using a precision film recorder.

Referring back to FIG. 1, the intermediate parallax record produced as described above is used in the third step of the process to produce the interlace-encrypted image.

Figure 5:
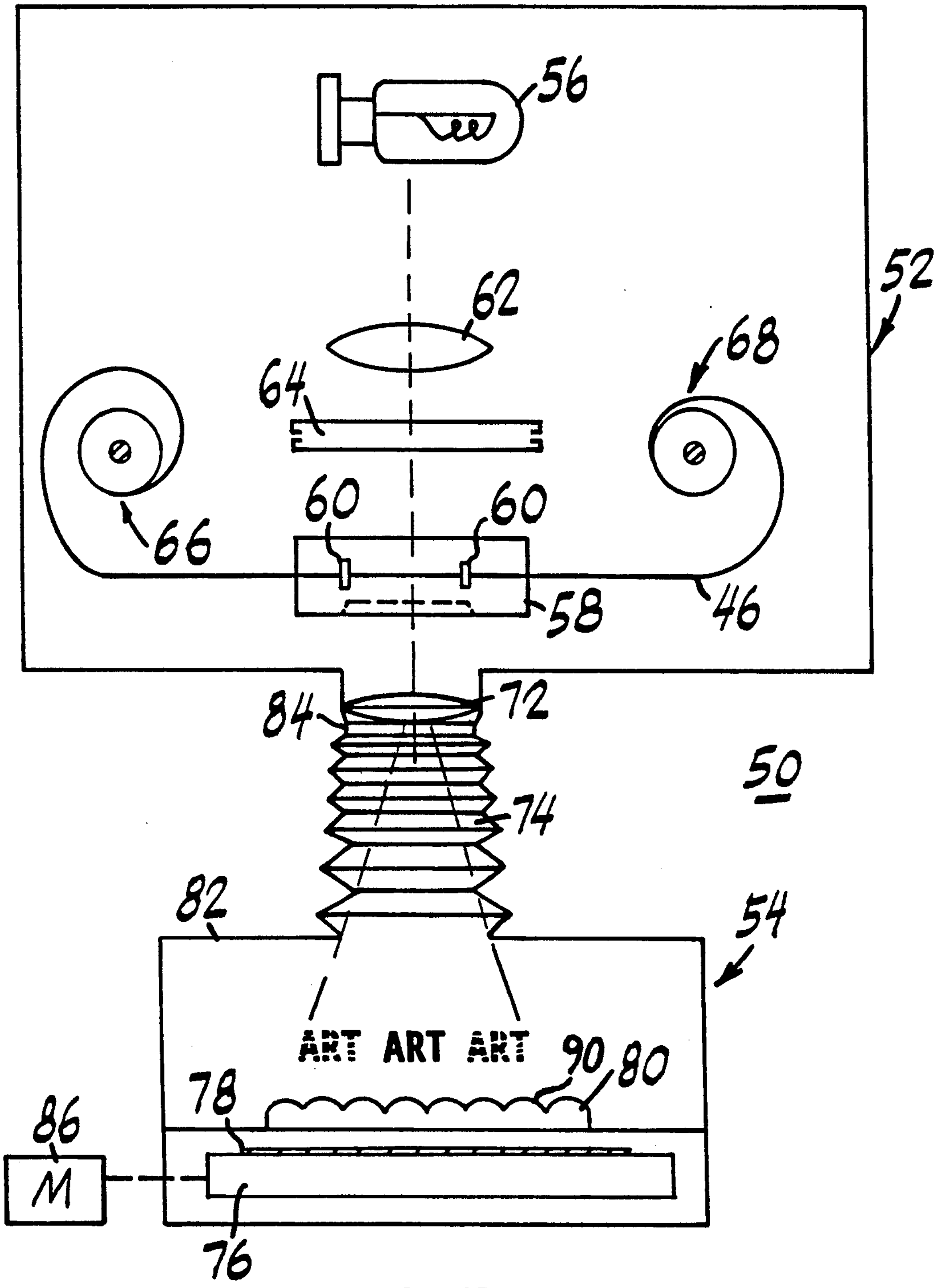
FIG. 5 is a schematic representation of apparatus which may be used in accordance with the present invention to create an interlace-encrypted image of the indicium.

Apparatus suitable for producing the interlace-encrypted image is shown schematically in FIG. 5. The apparatus, generally denoted at 50, consists of a projector 52 and an interlacing camera 54. The two parts are suitably mounted to assure accurate alignment of their respective optical axes.

Projector 52 consists of a source of illumination 56, a film support 58 including a fixed pin registered shuttle 60, a condensing lens 62, and a filter holder 64 adapted to receive any required neutral density and color correction filters.

The intermediate parallax record film strip 46 is supported on a feed reel 66 and a take up reel 68. A winder mechanism, not shown, moves film strip 46 through the projector one frame at a time. Between the incremental advances, films strip 46 is held stationery on fixed register pins 60. The delay time between incremental advances is determined by overall exposure requirements and is adjustable. A projection lens 72 produces the images of the successive frames of the parallax record which will be encrypted by interlacing camera 54.

The interlacing camera 54 is comprised of a bellows 74 coupled to projection lens 72, a projection back 76 for holding unexposed film 78 and a suitably mounted lenticular screen 80 described in more detail below. These components are contained in a suitable light tight enclosure 82. A shutter mechanism 84 may be mounted in bellows 74, or alternatively may be provided as part of projector 52.

Projection back 76 is so positioned that unexposed film 78 is precisely located at the focal plane of the combined optical system including projection lens 72 and lenticular screen 80. An extremely fine stepping motor 86 is mechanically coupled to projection back 76 so that the unexposed film 78 supported on the projection back may be advanced through a succession of precisely controlled incremental steps relative to lenticular screen 80. A suitable electromechanical control system, not shown, is coupled to the various operating parts of interlacing system 50 to provide the necessary interrelated control functions, as will be understood by those skilled in the art.

Lenticular screen 80 is generally conventional in construction, with a series of semi-cylindrical lenticules 90 having a spatial frequency R. Screen 80 is mounted in enclosure 82 with the axis of elongation of the lenticules transverse to the direction of movement of projection back 76.

As the interlace-encrypted image will generally contain substantial detail, best results are achieved if the encrypted image is produced on high resolution film, such as Kodak UGF7 or other high quality graphic arts camera film.

Figure 6:
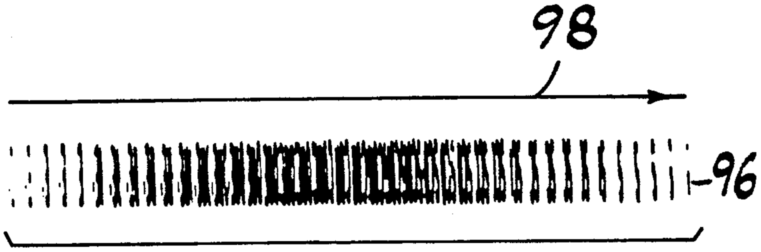
FIG. 6 is an enlarged pictorial representation of an interlace-encrypted image produced in accordance with this invention.

To produce the interlace-encrypted image, the first frame of intermediate parallax record film strip 46 is placed in position and an exposure is made on photographic medium 78. Projection back 76 is then moved by a precise step distance across the field of view of camera 54, and film strip 46 is advanced to the next frame. Shutter 84 is then operated so that a second exposure is made on photographic medium 78. Film strip 46 is then advanced to the next frame, projection back 76 is moved by a predetermined distance, and the process is repeated until the desired number of frames of film strip 46 have been exposed onto medium 78. The result is a series of precisely spaced images on photographic medium 78 produced through the cooperation of projection lens 72 and the individual lenticules 90 of lenticular screen 80. A representation of an interlace-encrypted image produced by the process and apparatus described above is shown at 96 in FIG. 6. Also shown in FIGURES is a "scan line" 98 corresponding to the direction of motion of projection back 76 in FIG. 5.

Careful selection of several parameters has proved to be an important factor contributing to the success of this invention. It has been found that there is a quite complex interrelationship between these parameters, notably including the spatial frequency and optical quality of lenticular screen 80, the amount of detail in indicium 20 the displacement distance of the indicium and the scan increment (i.e., the amount of parallax) employed in creating the intermediate parallax record, the scan increment and the resolution of the film employed in creating the interlace-encrypted image, as well as the pre-press image assembly and print reproduction capabilities of the printing process used.

Generally, best results are achieved if the intermediate parallax record scan increments are as small as possible, preferably less than about 2% of the dimension $D_i$ of the image of indicium 20 in the scan direction. The relative displacement of indicium 20 (i.e., the effective total movement recorded in the intermediate parallax record) should be as large as possible, but as a practical matter, little or no benefit is achieved with image displacements exceeding dimension $D_i$.

Other things being equal, best encryption is achieved if the displacement of the projected image, i.e., the amount of movement of the image of indicium 20 projected onto photosensitive medium 78, and the number of increments of relative movement are both large. (This is facilitated by having an intermediate parallax record with a large number of frames and small incremental steps of parallax.)

However, it has also been found that the total relative displacement between the lenticular screen and the photosensitive medium 78 must equal the spatial frequency R of the lenticular screen. The step distance S is determined according to the relationship $$S=R/N$$

where N is the number of increments.

Achieving small values for S given the need for large values of N requires a large value of R, but it has also been found that smaller values of R make the encrypted image more secure against copying.

In light of these conflicting requirements, suitable values for several of these parameters were determined by extensive experimentation, given constraints imposed by the printing process. In a preferred embodiment, an image of the selected indicium approximately 1.375" wide was used to create an interlace-encrypted image approximately 0.5" wide. An offset four-color printing press was employed. The intermediate parallax record consisted of 80 frames and N was also chosen to be 80. The projected image displacement was 0.3125" and the scan increment S was 0.00023". This required a spatial frequency R for the lenticular screen of 0.0185", or 54 lenticules per inch.

Referring again to FIG. 1, the next step is production of a color mask, which is subsequently printed in superposition with the interlace-encrypted color mask.

Broadly stated, the color mask consists of at least two sets of intersecting color elements. In the preferred embodiment, each color element is a set of parallel lines, each of a different color. The lines of each set intersect with the lines of the other set or sets to form a dark interference pattern.

The number of colors used is generally dictated by the application. If the item to which the identifier is applied is a four color printed item, it will often be impossible to use a two color mask as a third color in the job will itself be black. Other things being equal, however, a three color mask is preferred as it has been found to give greater security against counterfeiting.

Whatever colors are used, it has been found that the combination must be such that the resulting color in the area of intersection has a density approximately equal to or exceeding that of the encrypted image itself.

In a three color embodiment, the mask may consist of a first set of parallel magenta lines, a second set of parallel cyan lines, and a third set of parallel yellow lines. The sets of yellow and magenta lines may be parallel to each other, but are arranged to overlap so that respective yellow and magenta lines form orange bands in the area of overlap. The set of cyan lines is rotated slightly with respect to the yellow and magenta lines to cause an intersection between the cyan lines and those of the other two sets.

Figure 7:
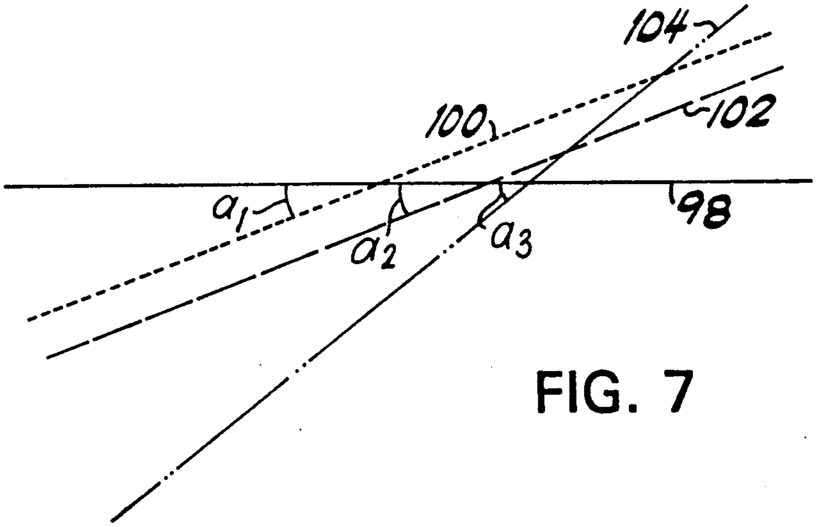
FIG. 7 is an illustration of how a color mask is produced according to the present invention.
Figure 8:
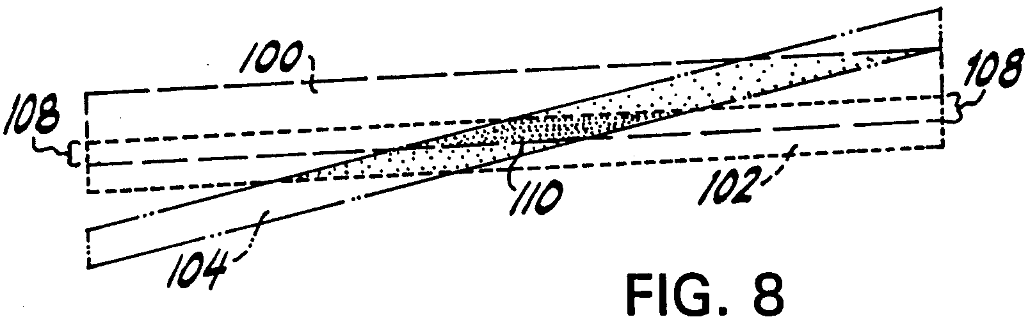
FIG. 8 is a greatly enlarged black and white representation of the portion of a color mask produced in accordance with this invention.

FIGS. 7 and 8 illustrate more clearly the nature of the color mask as described above. In FIG. 7, there is shown a first line 100 representative of the set of parallel magenta lines, a second line 102 representative of the set of parallel yellow lines, and a third line 104, representative of the set of parallel cyan lines. Lines 100–104 are all shown in relation to a fourth line 98 which represents the direction of scan of the interlace-encrypted image. This corresponds to the direction of travel of projection back 76 in FIG. 5, and scan line 98 shown in FIG. 6.

Referring still to FIG. 7, magenta line 100 lies at an angle $\alpha_1$ relative to the encrypted image scan line 98. Similarly, yellow line 102 lies at an angle $\alpha_2$ relative to the encrypted image scan line and cyan line 104 lies at an angle $\alpha_3$ relative to the encrypted image scan line. It will be understood that angles $\alpha_1$, $\alpha_2$, and $\alpha_3$ represent the angular rotation relative to the direction of elongation of the interlace-encrypted image in the final composite image forming the identifier. As mentioned above, the sets of yellow and magenta lines may be parallel to each other. In that case, $\alpha_1=\alpha_2$.

FIG. 8 shows an enlarged fragment of FIG. 7 in which the thickness of the magenta, yellow and cyan lines is greatly exaggerated for purposes of illustration. Referring to FIGS. 7 and 8, parallel magenta and yellow lines 100 and 102 overlap to form an intersecting area 108. As will be understood, the result will appear as a series of orange lines between the magenta and yellow lines when the mask is printed.

With the series of cyan lines 104 rotated slightly relative to the magenta and yellow lines 100 and 102, the result will be a series of intersections 110 between the cyan lines and the magenta/yellow overlap. The combined effect of the individual areas of overlap 110 will be a dark moire pattern. When the color mask and the interlace-encrypted image are superimposed in the final printing process, the moire pattern and the encrypted image will essentially occupy the same space. As a result, the identifier will be impossible to reproduce photographically (for counterfeiting purposes) without also recording the moire pattern.

It has been determined that the rotation, or orientation of the color bars relative to the scan line of the encrypted image, the width of the colored lines, and the line spacing are important parameters which must be controlled to achieve the desired objectives according to the present invention. For example, if the lines are too wide, or if the angles of intersection $\alpha_3$—$\alpha_1$ (and $\alpha_3$—$\alpha_2$) are tool small, the area covered by the resulting moire pattern will be too large and/or too dark, and the encrypted image will be so completely masked that it cannot be decoded even using a proper authenticator. If the lines are too thin, and/or the intersection angles too large, the interference pattern will be too small or too light, and the susceptibility to unauthorized reproduction will be increased.

Generally speaking, best results are achieved if the darkest lines are narrower than the lighter lines. For the embodiment illustrated in FIGS. 7 and 8, the yellow line should be the widest, and the cyan line should be the thinnest.

Within these constraints, it is also necessary that the lines be wide enough to assure overlap in light of the so-called "trap" requirements (i.e., sheet-to-sheet and other random variations) inherent in the process used to print the composite image. In the particular embodiment described, good results have been achieved when the yellow, magenta, and cyan components occupy about 20%, 15% and 10% of the image field, respectively, and with intersection angles $\alpha_3$—$\alpha_1$ (and $\alpha_3$—$\alpha_2$) in the range of about zero to about five degrees. Taking into account the overlap of the yellow and magenta lines, and the areas of intersection between the lines of all three colors, the total effective area occupied by the color mask should be in the range of about 40% or less of the image field.

Another interrelated factor is the spacing of the lines, which must be adjusted to meet the various considerations discussed above. Good results have been achieved if the spacing is comparable to that of the spatial frequency R of the lenticular array 80 (see FIG. 5.)

Generally speaking, it has been found that the relationship between these various parameters is so complex that for a given interlace-encrypted image, optimization of the color mask parameters by experimentation is necessary. This assures 15 that the resulting areas of intersection are large enough and dark enough to prevent the composite printed image from being copied, but small enough and light enough that viewing the interlace-encrypted image through the authenticator yields a clear image which is unambiguously authentic.

The latitude in color selection, as previously noted, is quite wide. Any two or three color combination may be selected, as long as the density of the areas of overlap is approximately the same as or greater than that of the interlace-encrypted image. For example, in a two-color mask, one primary color may be used in combination with its corresponding secondary color, or even with a near approximation of the pure secondary color. In a three color system, parallel sets of cyan and yellow overlapping lines may be provided. The resulting overlap will be green. A third set of parallel magenta lines may then be provided to intersect the the cyan and yellow lines.

Generally speaking, the values selected for angles $\alpha_1$ and $\alpha_2$ affect the appearance of the encrypted image when the authenticator is rotated away from the decrypting position. With larger angles, the "rainbow" effect is more pronounced. This may be desirable for esthetic purposes. Otherwise, values of $\alpha_1$ and $\alpha_2$ close to or equal to zero are satisfactory.

As yet another alternative, a three-color mask can be formed using a yellow background with intersecting magenta and cyan lines only. The result would be two series of green and orange lines. Where these intersect, the moire pattern will appear. The width, spacing and orientation of the lines would be optimized as described above to meet the functional requirements.

After the parameters for the color mask have been selected, the final step is to produce the plates or other master for printing the composite of the interlace-encrypted image and the color mask. As noted, the printing process is not itself a part of this invention. It is only required that precise registration be maintained between the interlace-encrypted image and the elements of the color mask. The order in which the color elements and the encrypted image are printed is not of importance.

Figure 9:
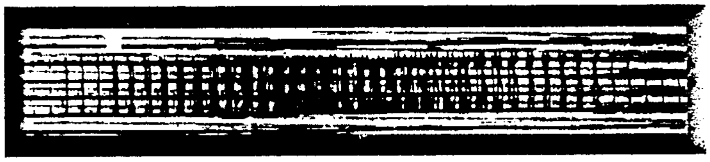
FIG. 9 is an actual interlace-encrypted and color masked identifier as may be applied to a document or other object.

FIG. 9 shows an example of a composite image using a three color mask produced according to this invention. (This is presented as an actual color sample as it is impossible to depict the image in the form of a photoreproduction or an ink drawing.) As may be seen, the composite consists of the encrypted black image corresponding to FIG. 6, and a grid of thin colored lines which intersect to produce a series of dark interference patterns.

Extensive experimentation has confirmed that the composite image can not be copied using currently available graphic arts equipment, or electro-optically, using currently available scanners and precision film recorders. As a result, it is not possible to reproduce an image of the identifier which can then be applied to counterfeit articles for the purpose of passing them off as genuine.

Similarly, without knowledge of the exact parameters chosen to create the interlace-encrypted image and the color mask, it is virtually impossible to create an original composite image which will not be revealed as a counterfeit when viewed through the authenticator. Even if the exact parameters are discovered, the effort and cost involved in creating the necessary lenticular screen and color mask so that a counterfeit identifier can be encrypted are generally prohibitive. This assures the authenticity of the article to which the composite image is applied, and when the system is used for check verification, assures that a counterfeit signature can not be encrypted and applied as the identifier on a check. If the genuine identifier is copied, or a counterfeit original is produced which does not exactly match the genuine identifier, viewing it through the authenticator immediately reveals a distorted image, or one which can not be decrypted at all.

While the invention has been described in terms of a preferred embodiment, and several alternative embodiments, and preferred values and ranges for certain key parameters have been presented, it should be understood that other variations are intended to be within the scope of the invention as well. For example, the intermediate parallax record, may be dispensed with and the encrypted image created directly by projecting a moving image of the identifying indicium through a lenticular screen moving relative to the photosensitive medium. In so doing, however, the flexibility in adjusting the size of the encrypted image is lost, along with the increased image sharpness atainable through use of the intermediate parallax record.

Other variations will also be apparent to one skilled in the art in light of the above description., and it is to be understood that the scope of the invention is to be measured only by the language and spirit of the appended claims.

We claim,

1. A method of authenticating the origin of an item comprising the steps of:

a. Selecting an indicium for identifying the origin of the item;
b. Creating an interlace-encrypted image of the identifying indicium by projecting a succession of images thereof through a lenticular array onto a recording medium for a predetermined exposure interval, and moving the recording medium relative to the lenticular array by a predetermined incremental scan distance between each exposure;
c. creating a color mask comprised of first and second intersecting elements each of a different color; and
d. printing the interlace-encrypted image and the color mask in superposition on the item.

2. An authentication method according to claim 1 further including the step of producing an intermediate parallax record of the selected indicium by creating a series of images thereof, each differing from the prior one by a predetermined amount of parallax, successive ones of the series of images of the intermediate parallax record being used to provide the succession of images projected onto the recording medium to create the interlace-encrypted image.

3. An authentication method according to claim 2 in which the images of the intermediate parallax record are created by recording a succession of images of the identifying indicium corresponding to a series of steps of incremental relative displacement between the indicium and a second recording medium.

4. An authentication method according to claim 3 in which the total relative displacement of the indicium is approximately equal to the dimension of the indicium in the direction of displacement.

5. An authentication method according to claim 4 in which the incremental relative displacement of the identifying indicium is less than approximately 2% of the dimension of the indicium in the direction of displacement.

6. An authentication method according to claim 1 in which the total relative displacement between the recording medium and the lenticular array for the succession of exposures is equal to the spatial frequency of the lenticular array.

7. An authentication method according to claim 6 in which the spatial frequency of the lenticular array is 0.0185", the incremental scan distance is 0.00023", and the number of images projected onto the recording medium is 80.

8. An authentication method according to claim 1 in which the colors are selected such that the density of the areas of intersection of the color elements is approximately equal to or greater than that of the interlace-encrypted image.

9. An authentication method according to claim in which the first color is selected from among the three primary colors, and the second color is the secondary color, or a near approximation thereof, corresponding to the first color.

10. An authentication method according to claim 9 in which the color mask covers approximately 40% of the area occupied by the interlace-encrypted image when printed on the item.

11. An authentication method according to claim 1 in which the color mask is created by forming a first set of spaced lines of one color to provide the first element, and by forming a second set of spaced lines of a second color to provide the second element, the lines of the first and second set respectively intersecting each other.

12. An authentication method according to claim 11 in which the colors are selected such that the density of the areas of intersection of the color elements is approximately equal to or greater than that of the interlace-encrypted image.

13. An authentication method according to claim 11 in which the background color of the field occupied by the lines of the first and second sets and the interlace-encrypted image is of a third color.

14. An authentication method according to claim 13 in which the first color is magenta, the second color is cyan and the third color is yellow.

15. An authentication method according to claim 11 in which the step of creating the color mask further comprises forming a third set of spaced lines of a third color, the first and third sets of lines being of such width and spacing as to partially overlap to create lines of a fourth color.

16. An authentication method according to claim 15 in which the lines of the second color element are formed to intersect the fourth-color lines, and in which the colors are selected such that the density of the areas of intersection between the lines of the second and fourth colors are of a density approximately equal to or greater than that of the interlace-encrypted image.

17. An authentication method according to claim 15 in which the first color is magenta, the second color is cyan, and the third color is yellow, whereby the area of overlap of the first and third colors is orange.

18. An authentication method according to claim 1 in which the step of creating the color mask further comprises the step of creating a third element of a third color, with the first and third elements partially overlapping each other o create a fourth element of a fourth color.

19. An authentication method according to claim 18 in which the second color element is arranged to intersect the fourth color element, and in which the colors are selected so that the density of the intersection of the second and fourth color elements is approximately equal to or greater than the density of the interlace-encrypted image.

20. An authentication method according to claim 18 in which the third element forms a background for the field occupied by the first and second elements and the interlace-encrypted image.

21. An authentication method according to claim 19 in which each color element is created by forming a set of parallel spaced lines.

22. An authentication method according to claim 21 in which the lines of the set forming the first element are parallel to the lines of the set forming the third element so that the fourth color element consists of a set of spaced parallel lines of the fourth color.

23. An authentication method according to claim 22 in which the lines of the first and third sets are selected to be parallel to the scan direction of the interlace-encrypted image.

24. An authentication method according to claim 21 in which the spacing and width of the line in the first, second, and third sets are selected such that the color mask covers approximately 40% of the field of the interlace-encrypted image when printed on the item.

25. An authentication method according to claim 19 in which the first color is magenta, the second color is cyan, and the third color is yellow, whereby the overlap between the first and third colors is orange.

26. An identifier for demonstrating the origin of an item comprising:

a. an encrypted image of an indicium of the origin of the item;

b. a color mask consisting of first and second intersecting elements each of a different color;

c. the encrypted image and the color mask being printed in registration with each other on the item.

27. An identifier for an item according to claim 26 in which the encrypted image is a multiple exposure of a succession of images of the indicium projected through a lenticular array onto a recording medium with the recording medium and the lenticular array being moved relative to each other by a predetermined incremental scan distance between each exposure.

28. An identifier for an item according to claim 27 in which each of the images of the indicium differs from the preceding one by a predetermined amount of parallax.

29. An identifier for an item according to claim 26 in which the the density of the areas of intersection of the color elements is approximately equal to or greater than that of the encrypted image.

30. An identifier for an item according to claim 29 in which the first color is one of the three primary colors, and the second color is the secondary color, or a near approximation thereto, corresponding to the first color.

31. An identifier for an item according to claim 30 in which the color mask covers approximately 40% of the area occupied by the encrypted image when printed on the item.

32. An identifier for an item according to claim 26 in which the color mask is comprised of a first set of spaced lines of one color forming the first element, and a second set of spaced lines of a second color forming the second element, the lines of the first and second set respectively intersecting each other.

33. An identifier for an item according to claim 32 in which the colors are selected such that the density of the areas of intersection of the color elements is approximately equal to or greater than that of the encrypted image.

34. An identifier for an item according to claim 33 in which the background color of the field occupied by the lines of the first and second sets and the encrypted image is of a third color.

35. An identifier for an item according to claim 34 in which the first color is magenta, the second color is cyan and the third color is yellow.

36. An identifier for an item according to claim 32 in which the color mask further comprises a third set of spaced lines of a third color, the first and third sets of lines being of such width and spacing as to partially overlap to create lines of a fourth color.

37. An identifier for an item according to claim 36 in which the lines of the second color element intersect the fourth-color lines, and in which the density of the areas of intersection between the lines of the second and fourth colors are approximately equal to or greater than that of the encrypted image.

38. An identifier for an item according to claim 36 in which the first color is magenta, the second color is cyan, and the third color is yellow, whereby the area of overlap of the first and third colors is orange.

39. An identifier for an item according to claim 26 in which the color mask further comprises a third element of a third color, with the first and third elements partially overlapping each other to create a fourth element of a fourth color.

40. An identifier for an item according to claim 39 in which the second color element intersects the fourth color element, and in which the density of the area of intersection of the second and fourth color elements is approximately equal to or greater than that of the encrypted image.

41. An identifier for an item according to claim 39 in which the third color element forms a background for the field occupied by the first and second elements and the encrypted image.

42. An identifier for an item according to claim 39 in which each color element is comprised of a set of parallel spaced lines.

43. An identifier for an item according to claim 42 in which the lines of the set forming the first element are parallel to the lines of the set forming the third element so that the fourth color element consists of a set of spaced parallel lines of the fourth color.

44. An identifier for an item according to claim 42 in which the spacing and width of the lines in the first, second, and third sets are such that the color mask covers approximately 40% of the field of the encrypted image when printed on the item.

45. An identifier for an item according to claim 40 in which the first color is magenta, the second color is cyan, and the third color is yellow, whereby the overlap between the first and third colors is orange.

46. A method of authenticating the origin of an item comprising the steps of:

a. Selecting an indicium for identifying the origin of the item;

b. Creating an encrypted image of the identifying indicium:

c. creating a color mask comprised of first and second intersecting elements each of a different color; and d. printing the encrypted image and the color mask in superposition on the item.

47. An authentication method according to claim 46 in which the encrypted image is produced by creating a multiple exposure of a succession of images of the indicium projected through a lenticular array onto a recording medium with the recording medium and the lenticular array being moved relative to each other by a predetermined incremental scan distance between each exposure.

48. An authentication method according to claim 47 in which each of the images of the indicium differs from the preceding one by a predetermined amount of parallax.

49. An authentication method according to claim 47 further including the step of producing an intermediate parallax record of the selected indicium by creating a series of images thereof, each differing from the prior one by a predetermined amount of parallax, successive ones of the series of images of the intermediate parallax record being used to provide the succession of images projected onto the recording medium to create the multiple exposure.

50. An authentication method according to claim 46 in which the colors are selected such that the density of the areas of intersection of the color elements is approximately equal to or greater than that of the encrypted image.

51. An authentication method according to claim 50 in which the first color is selected from among the three primary colors, and the second color is the secondary color, or a near approximation thereof, corresponding to the first color.

52. An authentication method according to claim 46 in which the color mask is created by forming a first set of spaced lines of one color to provide the first element, and by forming a second set of spaced lines of a second color to provide the second element, the lines of the first and second set respectively intersecting each other.

53. An authentication method according to claim 52 in which the colors are selected such that the density of the areas of intersection of the color elements is approximately equal to or greater than that of the encrypted image.

54. An authentication method according to claim 53 in which the background color of the field occupied by the lines of the first and second sets and the interlace-encrypted image is of a third color.

55. An authentication method according to claim 54 in which the first color is magenta, the second color is cyan and the third color is yellow.

56. An authentication method according to claim 52 in which the step of creating the color mask further comprises forming a third set of spaced lines of a third color, the first and third sets of lines being of such width and spacing as to partially overlap to create lines of a fourth color.

57. An authentication method according to claim 56 in which the lines of the second color element are formed to intersect the fourth-color lines, and in which the areas of intersection between the lines of the second and fourth colors are of a density approximately equal to or greater than that of the encrypted image.

58. An authentication method according to claim 56 in which the first color is magenta, the second color is cyan, and the third color is yellow, whereby the area of overlap of the first and third colors is orange.

59. An authentication method according to claim 46 in which the step of creating the color mask further comprises the step of creating a third element of a third color, with the first and third elements partially overlapping each other to create a fourth element of a fourth color.

60. An authentication method according to claim 59 in which the second color element is arranged to intersect the fourth color element, and in which the colors are selected so that the density of the intersection of the second and fourth color elements is approximately equal to or greater than the density of the encrypted image.

61. An authentication method according to claim 59 in which the third element forms a background for the field occupied by the first and second elements and the encrypted image.

62. An authentication method according to claim 59 in which each color element is created by forming a set of parallel spaced lines.

63. An authentication method according to claim 62 in which the lines of the set forming the first element are parallel to the lines of the set forming the third element so that the fourth color element consists of a set of spaced parallel lines of the fourth color.

64. An authentication method according to claim 63 in which the lines of the first and third sets are selected to be parallel to the scan direction of the encrypted image.

65. An authentication method according to claim 60 in which the first color is magenta, the second color is cyan, and the third color is yellow, whereby the overlap between the first and third colors is orange.

* * * * *